United States Patent
Legner

(10) Patent No.: US 9,016,053 B2
(45) Date of Patent: Apr. 28, 2015

(54) DEVICE FOR VARYING THE SWEPT VOLUMES OF A FIRST HYDRAULIC MACHINE AND A SECOND HYDRAULIC MACHINE

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 520 days.

(21) Appl. No.: 13/497,281

(22) PCT Filed: Sep. 2, 2010

(86) PCT No.: PCT/EP2010/062854
§ 371 (c)(1),
(2), (4) Date: Mar. 21, 2012

(87) PCT Pub. No.: WO2011/042266
PCT Pub. Date: Apr. 14, 2011

(65) Prior Publication Data
US 2012/0285156 A1     Nov. 15, 2012

(30) Foreign Application Priority Data
Oct. 9, 2009   (DE) .................... 10 2009 045 510

(51) Int. Cl.
*F15B 13/00*     (2006.01)
*F16H 61/421*    (2010.01)
(Continued)

(52) U.S. Cl.
CPC ............ *F16H 61/421* (2013.01); *F16H 61/431* (2013.01); *F16H 2039/005* (2013.01)

(58) Field of Classification Search
CPC   F16H 61/421; F16H 61/431; F16H 2039/005
USPC ................................................. 60/452, 492
See application file for complete search history.

(56) References Cited

U.S. PATENT DOCUMENTS 3,443,656 A     5/1969   Stolz
4,481,769 A  *  11/1984  Nagahara ................ 60/441
(Continued)

FOREIGN PATENT DOCUMENTS

DE           976 055        1/1963
DE     102007047193 A1      4/2009
(Continued)

OTHER PUBLICATIONS

Goellner W et al.: "Das Doppeljoch, ein innovativer Ansatz fuer hocheffiziente Leistungsverzweigungsgetriebe" O+P Olhydraulik und Pneumatik, Vereinigte Fachverlage, Mainz, DE, vol. 52, No. 11/12, Nov. 1, 2008.
(Continued)

*Primary Examiner* — Dwayne J White
*Assistant Examiner* — Matthew Wiblin
(74) *Attorney, Agent, or Firm* — Davis & Bujold, P.L.L.C.; Michael J. Bujold

(57) ABSTRACT

A device for varying the stroke of first and second hydraulic machines. At least one piston is functionally connected to axes of the hydraulic machines. Depending on power demanded by a driver, the piston can be acted upon, via position and high pressure control valve units of a valve system, with pressures that correspond to a pressure present in the hydraulic machines and that act in a first adjustment direction of the hydraulic machines axes. Pressure in the hydraulic machines is controlled by the position control valve unit and is limited by the high pressure control valve unit. The piston can be acted upon by the valve system with pressures that correspond to the pressure present in the hydraulic machines and that act in a second adjustment direction of the axes of the hydraulic machines, and action of the position control valve unit can be reversed.

18 Claims, 2 Drawing Sheets

(51) Int. Cl.
*F16H 61/431* (2010.01)
*F16H 39/00* (2006.01)

(56) References Cited

U.S. PATENT DOCUMENTS 4,768,340 A * 9/1988 Hamilton .................. 60/452
7,987,668 B2 * 8/2011 Kakino et al. ............. 60/452

FOREIGN PATENT DOCUMENTS

| WO | 2009/047041 A1 | 4/2009 | |
|----|----|----|----|
| WO | WO 2009047041 A1 * | 4/2009 | ............. F16H 61/42 |

OTHER PUBLICATIONS

German Search Report issued in corresponding German Patent Application No. 10 2009 045 510.8 mailed Dec. 22, 2014.

* cited by examiner

DEVICE FOR VARYING THE SWEPT VOLUMES OF A FIRST HYDRAULIC MACHINE AND A SECOND HYDRAULIC MACHINE

This application is a National Stage completion of PCT/EP2010/062854 filed Sep. 2, 2010, which claims priority from German patent application serial no. 10 2009 045 510.8 filed Oct. 9, 2009.

FIELD OF THE INVENTION

The invention concerns a device for varying the swept volumes of a first hydraulic machine and a second hydraulic machine.

BACKGROUND OF THE INVENTION

From WO 2009/047041 A1 an adjustment device for varying the stroke volume of hydraulic piston machines of inclined-axis design is known. The two piston machines are arranged adjacent to one another and can be actuated together by means of a so-termed double yoke in order to vary their stroke volume. Furthermore, the piston machines are connected to one another by working lines of a closed hydraulic circuit, and each can be operated as a pump or as a motor.

The double yoke for adjusting the stroke volumes of the piston machines co-operates with the piston machines in such manner that in a first end position of the double yoke the stroke volume of the first hydraulic piston machine has a minimum value, while the stroke volume of the second hydraulic piston machine is at its maximum value.

In a second end position of the double yoke the stroke volume of the first hydraulic piston machine is at its maximum value while the stroke volume of the second hydraulic piston machine is a minimum.

To adjust the double yoke, a double-action piston-cylinder device is provided, which is functionally connected to adjustable axes of the piston machines or hydraulic machines. The piston-cylinder device is functionally connected to the axes of the hydraulic machines by a piston rod coupled to a piston.

On the rod side, the piston-cylinder device is permanently acted upon by the high pressure that acts in the area of the hydraulic machines. In accordance with the restoring force required, the size of the bottom end of the piston is made larger than the effective surface of the piston on the rod side. The adjustment forces acting in the area of the piston-cylinder device are obtained from the restoring forces acting in the area of the inclined-axis units or hydraulic machines. Thus, in the area of a hydraulic machine operated as a pump it is endeavored to reduce the acting high pressure and automatically adjust to smaller absorption volumes. In the area of a hydraulic machine operated as a motor it is also endeavored to reduce the existing high pressure and change the stroke volume in the direction of a larger absorption volume.

As a function of a power demand by the driver, the piston of the piston-cylinder device is acted upon, via a valve system, in the area of a functional surface that delimits a piston space, with pressures that correspond to a hydraulic pressure present in the area of the hydraulic machines, which act in a first positioning direction of the axes of the hydraulic machines.

By means of the valve system, which in this case comprises a position regulating valve unit and a high pressure valve control unit, besides the hydraulic adjustment of the piston-cylinder device and hence of the stroke volume of the two hydraulic machines, it is also possible to cut off the pressure and to regulate the high pressure in the hydraulic line system of the adjustment device.

To be able to provide the functionality of the high pressure regulation by means of the high pressure control valve unit, a valve slide of the high pressure control valve unit is formed with two control surfaces. The high pressure present in the area of the hydraulic machines acts on a smaller control surface in order to provide a controllable pressure cut-off function, by virtue of which the maximum system pressure in the area of the hydraulic machines can be limited essentially without loss. In the area of a larger control surface of the valve slide of the high pressure control valve unit, a control pressure produced by a proportional control pressure regulation valve is applied, by means of which the upper pressure limit of the system pressure present in the system, defined by the pressure cut-off function, can be varied as a function of the operating condition or according to need.

In practice, hydro units actuated by the adjustment device described above and comprising hydraulic machines are coupled with mechanical transmission devices and form so-termed CVTs (Continuously-Variable Transmission), which are increasingly often made with more than one gear ratio range. Between the gear ratio ranges, within which the gear ratio can in each case be varied continuously between an upper gear ratio and a lower gear ratio, the change is preferably carried out in synchronous operating conditions of the areas of the CVT involved.

During engagement of the various gear ratio ranges, the hydraulic machines are used many times and when the first gear ratio range is engaged, a first hydraulic machine is initially operated as a pump and a second hydraulic machine is operated as a motor. When a second gear ratio range, subsequent to the first gear ratio range, is engaged in the CVT, the first hydraulic machine is operated as a motor and the second hydraulic machine as a pump. If, in addition, a third gear ratio range subsequent to the second gear ratio range is provided, in this third gear ratio range the first hydraulic machine is again operated as a pump and the second hydraulic machine as a motor, as is the case when the first gear ratio range is engaged. Other ranges are possible, the hydraulic machines being used in accordance with the description above.

However, this operating mode of the hydraulic machines during the engagement of the second gear ratio range has the result that in adjustment devices known from the prior art, opening of the high pressure control valve unit, which is carried out so as to limit the pressure in the area of the hydraulic machines, increases the delivery volume of the second hydraulic machine operating as a pump instead of reducing it during the regulation of the pressure in the area of the hydraulic machines, which is undesired.

For that reason, in a transition from the first gear ratio range to a second gear ratio range, with the adjustment device described above, the functionality of the high pressure adjustment of the high pressure control valve unit has to be deactivated.

In order, despite this, to be able to avoid inadmissibly high system pressures in the system, high pressure valve units are provided in the area of which, however, during a pressure limitation, power losses again take place, which give rise to undesired heating of the system.

SUMMARY OF THE INVENTION

Accordingly, the purpose of the present invention is to provide a device by means of which a high pressure control function can be carried out in all areas of a CVT without appreciable losses.

In the device according to the invention for varying the stroke volumes of a first hydraulic machine and a second hydraulic machine, which are designed as piston machines with inclined axes and whose stroke volume in each case depends on the swivel positions of axes of the hydraulic machines which can be adjusted conjointly by means of a double-action piston-cylinder device, such that at least one piston of the piston-cylinder device is functionally connected to the axes of the hydraulic machines, which, depending on a power demand by the driver, can be acted upon by means of a piston control valve unit and a high pressure control valve unit of a valve system in the area of a functional surface that delimits a piston space, with pressures that correspond to the hydraulic pressure present in the area of the hydraulic machines and that act in a first adjustment direction of the axes of the hydraulic machines, and such that the pressure in the area of the hydraulic machines can be set in a controlled manner by means of the position control valve unit and can be limited in a controlled manner by means of the high pressure control valve unit, the piston can be acted upon by means of the valve system in the area of a further functional surface that delimits a further piston space, with pressures that correspond to the hydraulic pressure present in the area of the hydraulic machines and that act in a second adjustment direction of the axes of the hydraulic machines, whereby the mode of action of the position control valve unit can be reversed in the area of the high pressure control valve unit.

The pressure in the area of the hydraulic machines can thus be limited to the desired extent in all the gear ratio ranges without appreciable losses, by means of the valve system and not in the area of pressure-limiting valves, in a manner that depends on the operating condition and according to need. This is achieved by virtue of the fact that the respective pressures acting in the area of the piston-cylinder unit upon the functional surfaces, which act in the first adjustment direction or in the second adjustment direction of the axes of the hydraulic machines, can be varied by means of the valve system and the mode of action of the position control valve unit in the area of the high pressure control valve unit can be reversed.

A high pressure regulation or a control pressure cut-off function can be carried out regardless of the respective operating modes of the hydraulic machines, i.e. whether they are operating as a motor or a pump, in all the gear ratio ranges of a CVT.

In an embodiment of the device according to the invention which is simple to operate, the high pressure control valve unit can be acted upon in the area of a control surface of a valve slide with the pressure present in the area of the hydraulic machines, which acts in opposition to a control force acting on the valve slide, preferably a spring force of a spring device, so that the pressure present in the area of the hydraulic machines is set as a function of the control force.

In advantageous embodiments of the device according to the invention, to apply the control force a proportional magnet is provided, or the control force is generated by means of a proportional control pressure that can be applied on another control surface of the valve slide of the high pressure control valve unit.

In a further development of the device according to the invention that can be operated with short control and regulation times, the piston space and the further piston space of the piston-cylinder device can be brought alternately by means of the valve system into connection with the pressure sides of the hydraulic machines or respectively an area whose pressure, when the hydraulic machines are operating, is lower than in the area of the pressure sides of the hydraulic machines. The shorter control and regulation times are achieved by virtue of the fact that the pressure force acting in opposition to a desired adjustment of the piston is reduced by a brief pressure drop in the area of one of the piston spaces.

In an embodiment of the device according to the invention which is simple to operate, the functional surfaces of the piston are equal in size.

A simply designed and inexpensive embodiment of the device according to the invention has a proportional magnet in the area of the position control valve unit, by means of which the position control valve unit is adjustably actuated in opposition to a spring device.

In a further development of the device according to the invention that can be operated with little control and regulation effort, the spring force of the spring device varies as a function of a mechanical coupling of the spring device with the piston of the piston-cylinder device.

Simply designed and both inexpensive and space-saving embodiments of the device according to the invention have a position control valve unit in the form of a 4/2-way valve and/or a high pressure control valve unit in the form of a 4/2-way valve.

In a further advantageous embodiment of the device according to the invention, pressure-limiting valves are provided in the area between the position control valve unit and the hydraulic machines, by means of which a defined high pressure level can be set. In this way, even in the event of a function failure of the high pressure control valve unit, inadmissibly high pressure values in the area of the hydraulic machines can be avoided with little design effort.

Further advantages and advantageous embodiments of the object according to the invention emerge from the claims and the example embodiments described below with reference to the drawing. For the sake of clarity, in the description of the various example embodiments the same indexes are used for components having the same structure and function.

Both the characteristics indicated in the claims and those indicated in the following example embodiments of the device according to the invention are in each case, whether considered in isolation or in any desired combination with one another, suitable for the further development of the object according to the invention. In relation to the further development of the object according to the invention, the respective combinations of features do not imply any limitation, but rather, are presented essentially only as examples.

DETAILED DESCRIPTION OF THE PREFERRED EMBODIMENTS

Figure 1:
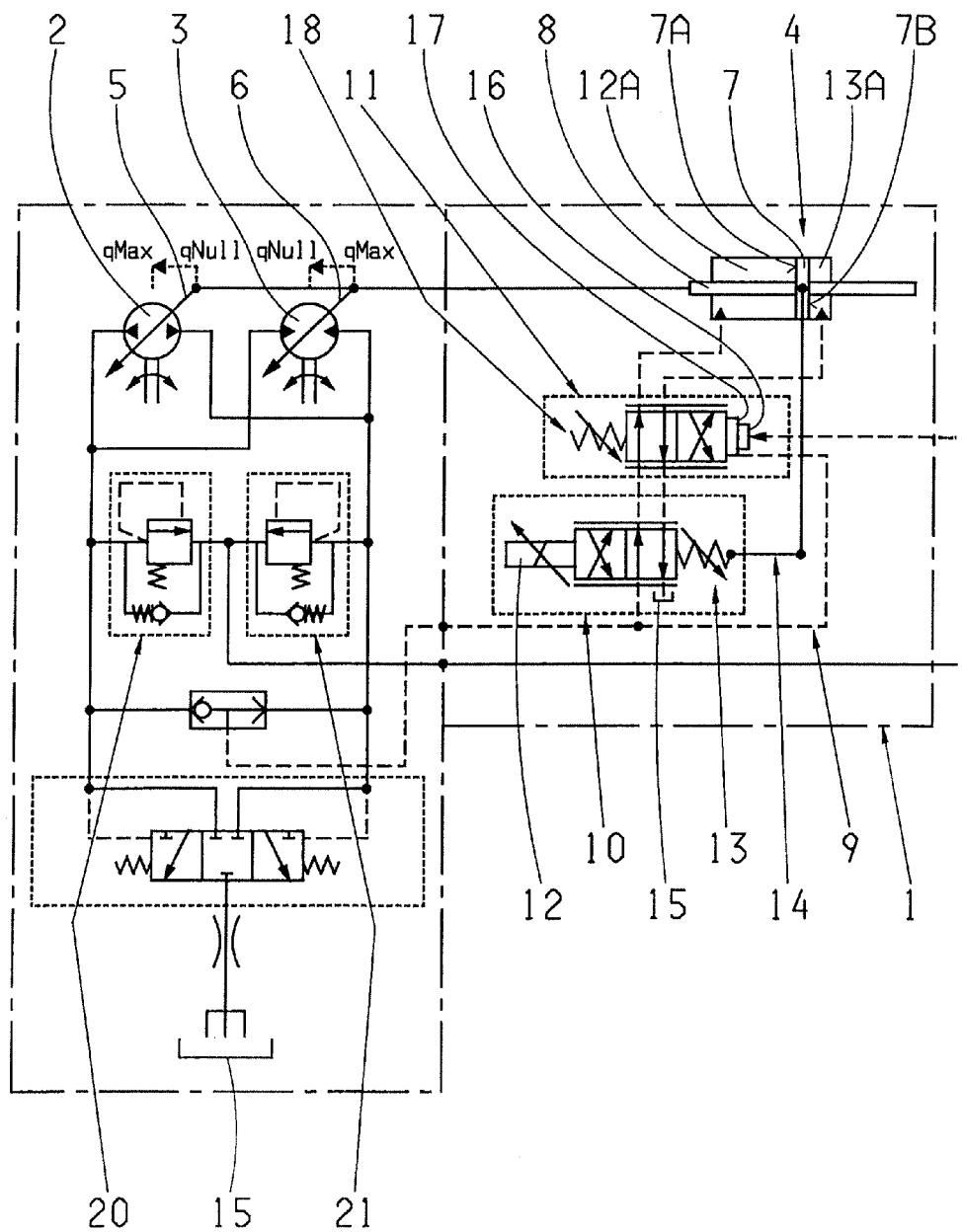
FIG. 1: A simplified hydraulic layout of a first example embodiment of the device according to the invention.

FIG. 1 shows a device 1 for varying the stroke volumes of a first hydraulic machine 2 and a second hydraulic machine 3, which are designed as piston machines with inclined axes and whose stroke volume depends in each case on the swivel positions of axes 5, 6 of the hydraulic machines 2, 3 that can be conjointly adjusted by means of a double-action piston-cylinder device 4. A piston 7 of the piston-cylinder device 4 is functionally connected to the axes 5, 6 of the hydraulic machines 2, 3 by a piston rod 8.

The hydraulic machines 2, 3 constitute a hydraulic device that forms an area of a CVT, by means of which part of a torque supplied by a drive machine of a vehicle drive-train can be transmitted hydrostatically toward a drive output. As the first power branch of a CVT, the hydrostatic unit is usually coupled with a mechanical system that forms a second power branch of the CVT by way of which, in turn, the respective other part of the torque from the drive machine can be transmitted between a transmission input and a transmission output. The two power branches are preferably functionally connected via a planetary gear system. Such CVTs are preferably made with a plurality of driving ranges for forward and reverse driving, which can in each case be engaged and disengaged by means of at least one shifting element that has to be disengaged and at least one shifting element that has to be engaged, and within which a gear ratio of the CVT can be varied continuously by varying the stroke volumes of the hydraulic machines 2, 3. To be able to carry out the driving range change in a synchronous manner, the two hydraulic machines 2, 3 can each be operated both as a pump and as a motor.

Below, the function of the device 1 in connection with a CVT will be described, by means of which three driving ranges for forward and reverse driving can be obtained. Further ranges are also possible.

When the first driving range is engaged in the CVT and at the same time the vehicle is stationary, the device 1 is in a so-termed rest position and the first hydraulic machine 2 is operated as a pump, while the second hydraulic machine 3 is operated as a motor. The absorption volume of the first hydraulic machine 2 in this operating condition is a minimum and the delivery volume of the second hydraulic machine 3 is at its maximum, so that the respective axes of the two hydraulic machines 2 and 3 are in the swivel position shown in FIG. 1.

In the present case the piston-cylinder device is associated with a valve system 9 which comprises a position control valve unit 10 and a high pressure control valve unit 11. Applied to the valve system 9 both in the area of the position control valve unit 10 and also in the area of the high pressure control valve unit 11 is in each case a hydraulic pressure that acts in the area of the hydraulic machines 2 and 3, which when the valve system 9 is appropriately actuated, can be applied in a first piston space 12A and in a second piston space 13A of the piston-cylinder device 4 to functional surfaces 7A and 7B of the piston 7.

The position control valve unit 10 and the high pressure control valve unit 11 are in this case in the form of 4/2-way valves or 4/2 control valves, and in relation to the hydraulic machines 2 and 3 the high pressure control valve unit 11 is connected downstream from the position control valve unit 10 and acts in opposition to the position control valve unit 10. In the example embodiment shown in FIG. 1, the position control valve unit 10 is actuated by a proportional magnet 12, although the position control valve unit 10 can also be actuated by an adjustable proportional pressure control valve.

The actuating force of the proportional magnet 12 is opposed by a spring force of a spring device 13 whose spring force varies as a function of a mechanical coupling of the spring device 13 to the piston 7 of the piston-cylinder device 4. By virtue of the mechanical coupling 14, the position of the piston 7 of the piston-cylinder device 4 is signaled back to the position control valve unit 10 and the two hydraulic machines 2 and 3 are actuated in a controlled manner.

If the controlling force produced in the area of the proportional magnet 12 is larger than the spring force of the spring device 13 acting on the valve slide of the position control valve unit 10, the pressure or high pressure present in the area of the hydraulic machines 2, 3 in the position of the high pressure control valve unit shown in FIG. 1 is passed into the second piston space 13A of the piston-cylinder device 4, while hydraulic fluid is drained out of the first piston space 12A, via the position control valve unit 10, into a pressure-free area 15 or tank.

As a result, starting from the position shown in FIG. 1 the piston 7, together with the piston rod 8, is displaced and the volume of the first piston space 12A becomes smaller while the volume of the second piston space 13A becomes larger. The result of the displacement of the piston rod 8 is that the delivery volume of the first hydraulic machine 2 operating as a pump increases and the delivery volume of the second hydraulic machine 3 operating as a motor decreases correspondingly. If the force produced in the area of the proportional magnet 12 corresponds to the spring force of the spring device 13, the position of the piston 7 is regulated.

In each case the respective adjustment position of the piston-cylinder device 4 determines the ratio between the absorption volumes of the respective hydraulic machine 2 or 3 operating as a pump and the respective hydraulic machine 3 or 2 operating as a motor. If the hydrostatic system formed by the two hydraulic machines 2 and 3 is attached to a secondary coupled power branching transmission, the driving speed of a vehicle, made with this transmission, can thereby be adjusted or controlled continuously.

The high pressure control valve unit 11 connected downstream from the position control valve unit 10 can have two functions. The first function is a so-termed pressure cut-off, whereas the second function is continuous high pressure regulation over the full operating range with appropriate actuation of the high pressure control valve unit 11. To implement the two functions, the high pressure control valve unit 11 is formed with two control surfaces 16 and 17, with the high pressure of the hydraulic machines 2 and 3 acting on the smaller control surface 17, whereas to the larger control surface 16, which in this case can be controlled proportionally by means of a control-pressure regulating valve (not shown), can apply a control pressure that is opposed by a spring force of a spring device 18 of the high pressure control valve unit 11.

Alternatively, however, the high pressure control valve unit 11 can be actuated by means of a proportional magnet 19 as shown in Fiq. 2 and in the manner described in more detail below.

The aim of the pressure cut-off function is that the pressure limitation is only limited in the area of high pressure limiting valves 20 and 21 in emergency cases and hydraulic fluid is ejected in the area of the high pressure limiting valves 20 and 21 from the high pressure side to the low pressure side. During a pressure limitation by the high pressure limiting valves 20 and 21 power losses occur, which very quickly overheat the hydrostatic transmission consisting of the two hydraulic machines 2 and 3 and which needlessly increase the fuel consumption of a drive machine, preferably in the form of an internal combustion engine, or a vehicle drive-train made with the CVT.

The high pressure limiting valves 20 and 21 are mainly provided to protect the system during highly dynamic load changes, since they are made with a shorter response time than the valve system 9 or the high pressure control valve unit 11. This avoids undesired damage in the hydraulic system of the device 1, which could not be prevented by the valve system 9 alone owing to its slower response behavior.

The purpose of the pressure cut-off function of the high pressure control valve unit 11 is to limit a maximum high pressure in the area of the hydraulic machines 2 and 3 to a lower pressure level than the opening pressure of the high pressure limiting valves 20, 21. For example, if the response limit of the high pressure limiting valves 20, 21 is 500 bar, the smaller control surface 17 acted upon by high pressure is designed such that the spring device 18 of the high pressure control valve unit 11 is overcome at about 460 bar so that the hydraulic fluid is drained out of the piston space 12A or out of the piston space 13A, in which the high pressure is respectively applied, and into the tank 15.

From the response time-point of the high pressure control valve unit 11 the drive output speed of whichever hydraulic machine 2 or 3 is operating as a motor is reduced and its absorption volume increased. At the same time the delivery volume of whichever hydraulic machine 3 or 2 is operating as a pump is reduced and its power take-up therefore reduced as well. The pressure cut-off is provided by the device 1 over the entire operating range of a CVT, i.e. over all the driving ranges, whereby the pressure in the area of the hydraulic machines 2, 3 and in the whole system is limited to the maximum value of 460 bar even without additional actuation of the high pressure control valve unit 11 in the area of the larger control surface 16 or without actuation by means of the proportional magnet 19.

By means of the proportional control pressure that can be applied in the area of the larger control surface 16 of the high pressure control valve unit 11, which is superimposed on the high pressure of the hydraulic machines 2 and 3 applied to the smaller control surface 17, the starting-point of the opening of the high pressure control valve unit 11 can be varied depending on the operating condition and according to need, and the maximum high pressure that can be reached in the system can be set in a controlled manner. The aim of this high pressure control is a continuous high pressure adjustment in the system, by virtue of which a vehicle can be operated with continuous adjustment of the traction force.

If the area ratio between the control surfaces 16 and 17 of the high pressure control valve unit 11 corresponds to about 100:3.9, a high pressure of about 100 bar corresponds to a control pressure in the area of the larger control surface 16 of about 3.9 bar. With a maximum control pressure of 18 bar in the area of the larger control surface 16, the high pressure in the system can be influenced over the entire operating range of the device 1, whereby the maximum value of the pressure cut-off function is set to 460 bar when the larger control surface 16 is not pressurized. As the control pressure in the area of the larger control surface 16 increases, the start of opening of the high pressure control valve unit 11 is reduced in such manner that each increase of the control pressure by about 3.9 bar reduces the start of opening of the high pressure control valve unit 11 by about 100 bar.

If the two proportional functions, i.e. the continuous delivery amounts and also the high pressure regulation, are superimposed, the power take-up of the hydrostatic system comprising the two hydraulic machines 2 and 3 can be adjusted.

Figure 2:
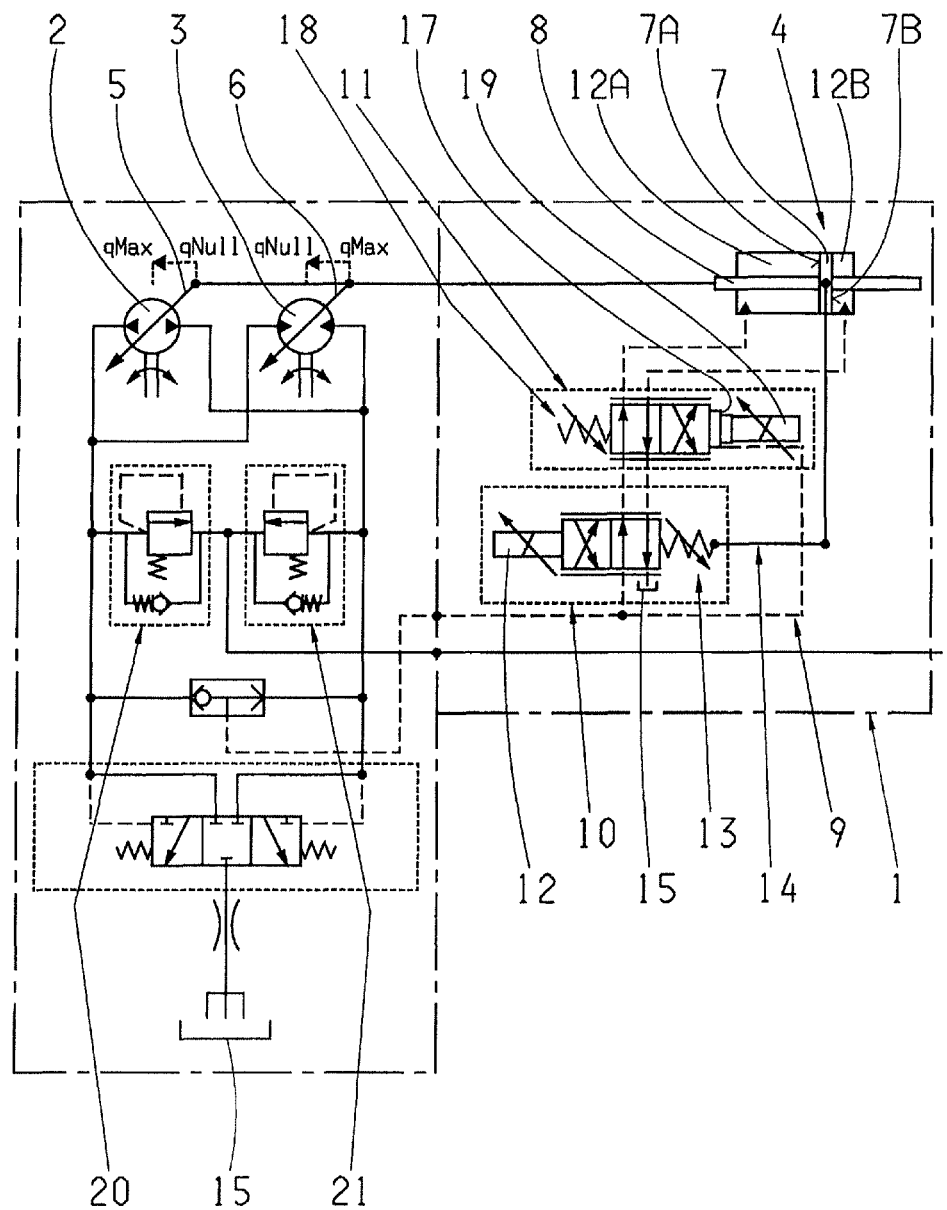
FIG. 2: A representation corresponding to that of FIG. 1, of a second example embodiment of the device according to the invention.

With appropriate actuation of the position control valve unit 10 by the proportional magnet, in all the transmission ratio ranges of the CVT the delivery amount of whichever hydraulic machine 2 or 3 is operating as a pump is increased. If the high pressure control valve unit 11 is actuated by correspondingly high control pressures in the area of the control surfaces 17 and 16, i.e. the valve slide of the high pressure control valve unit 11 acting in opposition to the spring force of the spring device 18 is displaced away from its position shown in FIGS. 1 and 2 in the direction toward its second end position, the delivery volume of the hydraulic machine 2 or 3 operating as a pump is reduced. Owing to the intersecting mode of operation of the two control valves, i.e. the position control valve unit 10 and the high pressure control valve unit 11, the position and pressure regulation can be carried out in all the transmission ratio ranges of a CVT without restriction, and at the same time with low losses.

INDEXES

1 Device
2 First hydraulic machine
3 Second hydraulic machine
4 Piston-cylinder device
5, 6 Axes
7 Piston
7A Functional surface
7B Further functional surface
8 Piston rod
9 Valve system
10 Position control valve unit
11 High pressure control unit
12 Proportional magnet
12A First piston space of the piston-cylinder device
13 Spring device
13A Second piston space of the piston-cylinder device
14 Mechanical coupling
15 Unpressurized area, tank
16 Larger control surface
17 Smaller control surface
18 Spring device
19 Proportional magnet
20, 21 High pressure limiting valves

The invention claimed is:

1. A device (1) for varying stroke volumes of a first hydraulic machine (2) and a second hydraulic machine (3), which are both designed as piston machines with inclined axes, and a stroke volume of the first and the second hydraulic machines (2, 3) depends on swivel positions of axes (5, 6) of the first and the second hydraulic machines (2, 3) that are adjusted conjointly by a double-action piston-cylinder device (4), at least one piston (7) of the piston-cylinder device (4) being functionally connected to the axes (5, 6) of the first and the second hydraulic machines (2, 3) for controlling a position thereof, the at least one piston (7), depending on a power demand from a driver, being acted upon by a position control valve unit (10) and a high pressure control valve unit (11) of a valve system (9) on a first side of a first functional surface (7A) of the piston (7) that delimits a first piston space (12A), with pressure that correspond to a hydraulic pressure present in an area of the first and the second hydraulic machines (2, 3) and that acts in a first adjustment direction of the axes (5, 6) of the first and the second hydraulic machines (2, 3), and the pressure in the area of the first and the second hydraulic machines (2, 3) being set, in a controlled manner, by the position control valve unit (10) and the pressure in the area of the first and the second hydraulic machines (2,3) being limited, in a controlled manner, by the high pressure control valve unit (11) of the valve system (9), the at least one piston (7) being acted upon by the position control valve unit (10) and the high pressure control valve unit (11) on an opposed second functional surface (7B) of the piston (7) that delimits a further piston space (13A) with pressure that correspond to the hydraulic pressure present in the area of the first and the second hydraulic machines (2, 3) and that acts in a second adjustment direction of the axes (5, 6) of the first and the second hydraulic machines (2, 3), and the mode of action of the position control valve unit (10) being reversable in an area of the high pressure control valve unit (11).

2. The device according to claim 1, wherein the high pressure control valve unit (11) is acted upon, in an area of a control surface (17) of a valve slide, by the pressure present in the area of the first and the second hydraulic machines (2, 3), which acts in opposition to a spring force of a spring device (13), and the pressure present in the area of the first and the second hydraulic machines (2, 3) is adjusted as a function of the spring force.

3. The device according to claims 1, wherein the pressure present in the area of the first and the second hydraulic machines (2, 3) is varied by a further control force that is applied to the high pressure control valve unit (11), which acts in opposition to a spring force acting on a valve slide of the high pressure control valve unit (11).

4. The device according to claim 3, wherein the further control force is provided by a proportional magnet (19).

5. The device according to claim 3, wherein the further control force is generated by a proportional control pressure that is applied to a further control surface (16) of the valve slide of the high pressure control valve unit (11).

6. The device according to claim 1, wherein the piston space (12A) and the further piston space (13A) of the piston-cylinder device (4) are alternatively brought into connection with either pressure sides of the first and the second hydraulic machines (2, 3) or an area (15) whose pressure during operation of the first and the second hydraulic machines (2, 3) is lower than in an area of the pressure sides of the first and the second hydraulic machines (2, 3).

7. The device according to claim 1, wherein the first functional surface and the second functional surface (7A, 7B) of the piston (7) have an equal size.

8. The device according to claim 1, wherein the position control valve unit (10) is adjustable by a proportional magnet (12) which acts against a spring force of a spring device (13).

9. The device according to claim 8, wherein the spring force of the spring device (13) of the position control valve unit (10) varies as a function of a mechanical coupling (14) of the spring device (13) with the piston (7) of the piston-cylinder device (4).

10. The device according to claim 1, wherein the position control valve unit (10) is a 4/2-way valve.

11. The device according to claim 1, wherein the high pressure control valve unit (11) of the valve system (9) is arranged between the position control valve unit (10) and the piston space and the further piston space (12A, 13A) of the piston-cylinder device (4).

12. The device according to claim 1, wherein the high pressure control valve unit (11) is a 4/2-way valve.

13. The device according to claim 1, wherein pressure limiting valves (20, 21) are located in an area between the position control valve unit (10) and the first and the second hydraulic machines (2, 3) by which a defined high pressure level is set in the area of the first and the second hydraulic machines (2, 3).

14. A device (1) for varying stroke volumes of first and second hydraulic machines (2, 3), each of the first and the second hydraulic machines (2, 3) being a piston machine and comprising an inclined axes (5, 6), the stroke volumes of the first and the second hydraulic machines (2, 3) depending on a swivel position of the respective inclined axes (5, 6) that are adjusted conjointly by a double-action piston-cylinder device (4), the piston-cylinder device (4) comprising a piston (7) functionally connected to both of the inclined axes (5, 6) of the first and the second hydraulic machines (2, 3), the piston (7) comprising opposed first and second functional surfaces (7A, 7B) which respectively define first and second piston spaces (12A, 13A) within a cylinder, the inclined axes (5, 6) of the first and the second hydraulic machines (2, 3) being adjustable, via the piston (7), by a position control valve unit (10) and a high pressure control valve unit (11) of a valve system (9) depending on a power demand from a driver, hydraulic pressure, applied directly to the first functional surface (7A) of the piston (7), biasing the piston (7) and the axes (5, 6) of the first and the second hydraulic machines (2, 3) in a first adjustment direction, while hydraulic pressure applied by the position control valve unit (10) and the high pressure control valve unit (11) to the second functional surface (7B) biasing the piston (7) and the axes (5, 6) of the first and the second hydraulic machines (2, 3) in a second adjustment direction such that the hydraulic pressures applied present in areas of the first and the second hydraulic machines (2, 3) being set, in a controlled manner, by the position control valve unit (10) and limited, in a controlled manner, by the high pressure control valve unit (11) of the valve system (9), and a mode of action of the position control valve unit (10) being reversable in an area of the high pressure control valve unit (11).

15. The device according to claim 14, wherein the high pressure control valve unit (11) is acted upon, in an area of a control surface (17) of a valve slide, by the pressure present in the area of the first and the second hydraulic machines (2, 3), which acts in opposition to a spring force of a spring device (13), and the pressure present in the area of the first and the second hydraulic machines (2, 3) is adjusted as a function of the spring force.

16. The device according to claim 15, wherein the position control valve unit (10) is adjustable by a proportional magnet (12) which acts against a spring force of a spring device (13).

17. The device according to claim 16, wherein the spring force of the spring device (13) of the position control valve unit (10) varies as a function of a mechanical coupling (14) of the spring device (13) with the piston (7) of the piston-cylinder device (4).

18. The device according to claim 17, wherein the position control valve unit (10) is a 4/2-way valve.

* * * * *